2,992,990
SOFT MAGNETIC MATERIAL
Richard G. Parker, Wallkill, N.Y.
No Drawing. Filed. Jan. 5, 1956, Ser. No. 557,447
5 Claims. (Cl. 252—62.5)

This invention relates to a soft magnetic material formed of metallic oxides of the spinel structure and silica. This material is valuable for use as a high frequency core material.

It is known that the mineral franklinite, of the formula (FeZnMn)FeO$_2$, when purified by flotation after pulverization, compacted and sintered in air, possesses high permeability of the order of 100 to 350 at high frequencies of the order of 15 kilocycles per second to 2 megacycles (2,000 kilocycles) per second. Certain original additions and modes of manufacture, however, yield a more useful product.

My invention relates to the discovery that the addition of silica to a spinel structure, such as $$(x)Mn(z)Zn(y)Fe_2O_4$$

yields a dense, nonporous material prior to complete vitrification, and at normal ambient temperatures substantially reduces the change of permeability due to temperature change in the end product.

The use of talc as the source of silica or silicate tends to cause fluxing at a lower temperature than with pure SiO$_2$. The magnesium ion in talc (MgSiO$_3$) will enter into the magnetic spinel structure, while the silicate ion permits the formation of a dense body at a temperature of about 2000° F. This temperature is below the temperature at which the full magnetic properties of the material are achieved.

The valence of manganese is unstable at the temperature at which the optimum magnetic properties are developed and tends to change from a valence state of plus two to plus three and thus vitiates the spinel structure. It is imperative, therefore, either precisely to control the atmosphere as set forth in Snoek Patents Nos. 2,551,711 and 2,579,978 or to prevent the atmosphere from affecting more than an extremely thin surface layer of the core material. It is this later method of preparation, and the magnetic resulting material therefrom that is set forth in this invention.

With the foregoing and other objects in view as will appear from a reading of the following specification and claims, the invention resides in the novel arrangement and combination of parts and in the details of construction and process of manufacture hereinafter described and claimed, it being understood that changes in the precise embodiment of the invention may be made within the scope of what is claimed without departing from the spirit of the invention. It will be further understood that my invention is susceptible of embodiment in many and various forms, and that the structural details or particular steps of the method herein set forth may be varied to suit particular purposes and still remain within my inventive concept.

It also has been discovered that the inclusion of silica between the crystal domain boundaries of the magnetic oxide material, by merely embodying a small percentage of silica (for example, 1%) during the preparation of the oxides results in a material reduction of the temperature instability of the material (for example, by a factor of one half). In one instance, the temperature coefficient of the magnetic oxide material was reduced from .15% to .08% change in permeability per degree C. by the addition of 1% silica. This result is caused by a decrease in the ability of the domain boundaries to shift during radio-frequency excitation at normal ambient temperatures as the temperature rises.

For a soft magnetic material to be useful at high frequencies, it has been held that high volume D.C. resistivity or fine subdivision of the magnetic material and insulation of the discrete particles is necessary. However, it is evident that in the case of low field strengths, the eddy current losses (as they are called) are of small importance. In producing an extremely dense material, as in this invention, low volume resistivities in the order of $1 \times 10^{-1}$ ohm centimeters are noted, and yet below radio frequencies of about 2 megacycles, the total losses of the core material are sufficiently small to make the material of considerable value.

In addition, the dense, low resistance, high permeability core material is surrounded by a thin, high resistance layer, having a volume resistivity in excess of $1 \times 10^8$ ohm centimeters. This permits wire to be wound directly on the core material without shorting out the inductance. However, if desired, the surface layer may be ground away at points, leaving a conducting path of controllable resistance value. This unique property, as set forth in this invention offers a means of producing an inductance and resistance in parallel or series in one single component.

Further, the extreme density of the magnetic material renders unnecessary any waterproofing process or other protection from the atmosphere after the material is fired. This property is achieved by virtue of the addition of silica or silicates, and results in high stability of permeability regardless of humidity or immersion of the magnetic material in any liquid.

It has been found that the material set forth in this invention may easily be synthesized by intimately mixing Fe$_2$O$_3$ of about 54 mol percent, ZnO of about 12 to 18 mol percent, MnO$_2$ (in the form of manganese ore containing approximately 86% of MnO$_2$) of about 32 to 26 mol percent, and with SiO$_2$, present in the manganese ore of about 1 mol percent, and talc, MgSiO$_3$, of about 1 mol percent.

A second formulation, yielding a similar product, utilizes a zinc oxide-iron oxide-silica pigment containing by weight approximately 80% ZnO, 12.5% Fe$_2$O$_3$, and 2.5% SiO$_2$, plus 5%, more or less, of certain impurities. This pigment material is intimately mixed with Fe$_2$O$_3$, MnO$_2$, and talc (MgSiO$_3$) so as to yield a compound containing approximately 54 mol percent Fe$_2$O$_3$, about 12 to 18 mol percent ZnO, about 32 to 26 mol percent MnO$_2$, and about 1 mol percent SiO$_2$ present in the manganese ore and in the zinc oxide-iron oxide-silica pigment, and about 1 mol percent talc (MgSiO$_3$). Because of its high apparent density (in the unfired state) this composition creates a ceramic body of lower shrinkage during firing, thereby reducing warpage and cracking. The intimate admixture of silica and ferric oxide with the zinc oxide assures the even distribution of these components in the final composition. Another very important factor is that the cost of the final product is reduced as a result of the lower price of the various ingredients.

One specific example of a material made within the above range is as follows:

| | Mol percent |
|---|---|
| Fe$_2$O$_3$ | 54 |
| ZnO | 16 |
| MnO$_2$ | 27 |
| MgSiO$_3$ | 1 |
| Silica | 1 |
| and, if desired, | |
| Titanium dioxide | 1 |

The properties of a material covered by the above example would be approximately as follows:

Initial permeability approximately 300
Volume resistivity generally less than and approximately 0.2 ohm-cm.
Curie temperature approximately 200° C.

These materials are dry mixed together with an organic binder and lubricant, such as methylcellulose, sodium alginate, or polyvinyl alcohol, of about 1% by weight (sometimes, in addition, ½% bentonite is added), and with moisture sufficient to produce a plastic mass; vacuum de-aired to eliminate interstices of air and densify the material pressed or extruded to the desired rod, tube or other form under approximately 1 ton/sq. in.; dried and sintered at a temperature in the range from about 2160° F. to 2240° F. in air, or in a gas kiln in which certain excess air is present. The excess of air is in the range of 20–40% which is normal in the ceramic industry. The material is then cooled as rapidly as possible without causing fracture of the fired body at, for example, approximately 25° C. per minute. A more uniform, controllable and temperature stable product is the result, and one that lends itself to ease of production.

What is claimed is:

1. A soft magnetic material formed by intimately mixing and sintering at a temperature in the range from approximately 2160° F. to approximately 2240° F. $Fe_2O_3$ about 54 mol percent, ZnO about 12 to 18 mol percent, $MnO_2$ (in the form of manganese ore containing approximately 86% of $MnO_2$) about 32 to 26 mol percent, and with $SiO_2$, present in the manganese ore about 1 mol percent, and talc about 1 mol percent.

2. A soft magnetic material formed by intimately mixing and sintering at a temperature in the range from approximately 2160° F. to approximately 2240° F. a zinc oxide, iron oxide silica pigment containing approximately by weight 80% zinc oxide, 12½% $Fe_2O_3$, and 2.5% $SiO_2$, plus approximately 5% of impurities, with $Fe_2O_3$, $MnO_2$ and $MgSiO_3$, so as to yield a compound containing approximately 54 mol percent $Fe_2O_3$, 12 to 18 mol percent ZnO, 32 to 26 mol percent $MnO_2$, and about 1 mol percent $SiO_2$ and about 1 mol percent $MgSiO_3$.

3. A soft magnetic material formed by intimately mixing and sintering at a temperature in the range from approximately 2160° F. to approximately 2240° F. $Fe_2O_3$ about 54 mol percent, ZnO about 17 mol percent, $MnO_2$ about 27 mol percent, $MgSiO_3$ about 1 mol percent, and silica about 1 mol percent.

4. A soft magnetic material as set forth in claim 3, having the following properties: initial permeability of approximately 300; volume resistivity generally less than and approximately 0.2 ohm-cm.; surface resistivity of approximately 1 million ohm-cm., and Curie temperature of approximately 200° C.

5. A soft magnetic material formed by intimately mixing, and sintering at a temperature in the range from approximately 2160° F. to approximately 2240° F., $Fe_2O_3$ about 54 mol percent, ZnO about 17 mol percent, $MnO_2$ about 27 mol percent, $MgSiO_3$ about 1 mol percent, and silica about 1 mol percent, mixing said materials with an organic binder and lubricant about 1 percent by weight and with the moisture sufficient to produce a plastic mass; forming to the desired shape, drying and sintering at the said temperature in air, in which the excess of air is in the range of 20 to 40%, and cooling the material as rapidly as possible, without causing fracture of the body, at approximately 25° C. per minute, and grinding away the surface layer at various points leaving a conducting path of controllable resistance value and thereby providing a means for producing an inductance and resistance in parallel or series in a single component.

References Cited in the file of this patent
UNITED STATES PATENTS

| | | |
|---|---|---|
| 1,818,070 | Lathrop | Aug. 11, 1931 |
| 1,827,376 | Shermund | Oct. 13, 1931 |
| 1,845,144 | Gillis | Feb. 16, 1932 |
| 1,881,711 | Lathrop | Oct. 11, 1932 |
| 2,509,758 | Brockman | May 30, 1950 |
| 2,551,711 | Snoek et al. | May 8, 1951 |
| 2,565,111 | Albers-Schoenberg | Aug. 21, 1951 |
| 2,579,978 | Snoek et al. | Dec. 25, 1951 |
| 2,656,319 | Berge | Oct. 20, 1953 |
| 2,723,238 | Simpkiss | Nov. 8, 1955 |
| 2,764,552 | Buckley et al. | Sept. 25, 1956 |
| 2,862,845 | Szegvari | Dec. 2, 1958 |

FOREIGN PATENTS

| | | |
|---|---|---|
| 683,722 | Great Britain | Dec. 3, 1952 |
| 697,219 | Great Britain | Sept. 26, 1953 |
| 513,734 | Canada | June 14, 1955 |

OTHER REFERENCES

"R.C.A. Review," September 1950, vol. XI, No. 3, p. 346.